(12) United States Patent
Maekawa et al.

(10) Patent No.: US 8,928,757 B2
(45) Date of Patent: Jan. 6, 2015

(54) CALIBRATION OPERATION DEVICE, CAMERA DEVICE, CAMERA SYSTEM AND CAMERA CALIBRATION METHOD

(75) Inventors: Takashi Maekawa, Yokohama (JP); Takeo Oshima, Kanagawa (JP); Haruo Yanagisawa, Kanagawa (JP); Ryuuichi Sawada, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 363 days.

(21) Appl. No.: 13/542,965

(22) Filed: Jul. 6, 2012

(65) Prior Publication Data
US 2013/0265442 A1 Oct. 10, 2013

(30) Foreign Application Priority Data

Apr. 4, 2012 (JP) ................. 2012-085963

(51) Int. Cl.
H04N 17/00 (2006.01)
G06T 7/00 (2006.01)
H04N 7/18 (2006.01)
(52) U.S. Cl.
CPC ............ *H04N 17/002* (2013.01); *G06T 7/0018* (2013.01); *B60R 2300/402* (2013.01)
USPC .......................................... 348/178; 348/148
(58) Field of Classification Search
USPC ....................................................... 348/187
See application file for complete search history.

(56) References Cited

U.S. PATENT DOCUMENTS

2005/0002558 A1* 1/2005 Franke et al. ................ 382/154
2010/0066828 A1* 3/2010 Disaro et al. ................ 348/143
2010/0245578 A1* 9/2010 Kakinami .................... 348/148
2012/0314073 A1* 12/2012 Shimoda et al. ............ 348/148
2012/0320209 A1* 12/2012 Vico et al. .................... 348/148
2013/0182906 A1* 7/2013 Kojo et al. .................... 382/103
2013/0321629 A1* 12/2013 Zhang et al. ................ 348/148

FOREIGN PATENT DOCUMENTS

JP 2000-209577 A 7/2000

OTHER PUBLICATIONS http://gazoo.com/G-Blog/chibanocienta/25496/Article.aspx; Jul. 22, 2007.

* cited by examiner

*Primary Examiner* — Sath V Perungavoor
*Assistant Examiner* — Howard D Brown, Jr.
(74) *Attorney, Agent, or Firm* — Studebaker & Brackett PC

(57) ABSTRACT

An object of the present invention is to simplify an operation for calibration of a camera and to shorten a time necessary for the calibration. A camera calibration device 10 includes: a camera 11 configured to take an image including an index 41 provided outside a movable object 100; an image superimposing unit 122 configured to generate a superimposed image by superimposing a calibration object 42 having a first adjustment part 421 indicating a predetermined area and a second adjustment part 422 indicating a predetermined rotation area; and a calculation unit 124 configured to control the image superimposing unit 122 to generate the superimposed image in which the calibration object 42 is shifted based on a shift instruction of the calibration object 42 and to calculate, based on a position of the calibration object 42 after being shifted in the superimposed image such that an end of the index 41 is included in the area of the first adjustment part 421 and the index 41 is positioned in the rotation area of the second adjustment part 422, parameters relative to a pan angle, a tilt angle and a roll angle for calibrating displacement of a mounting position of the camera 11.

15 Claims, 12 Drawing Sheets

CALIBRATION OPERATION DEVICE, CAMERA DEVICE, CAMERA SYSTEM AND CAMERA CALIBRATION METHOD

CROSS REFERENCE TO RELATED APPLICATION

This application claims priority to and the benefit of Japanese Patent Application No. 2012-085963 filed on Apr. 4, 2012, the entire contents of which are incorporated herein by reference.

FIELD OF THE INVENTION

The present invention relates to a calibration operation device, a camera device, a camera system and a camera calibration method for calibration of an angle of a camera mounted on a movable object.

BACKGROUND OF THE INVENTION

There is known a camera system that enables, by using a camera mounted on a rear side of a vehicle to display an image behind the vehicle where it is hard for a driver to view on a display unit inside the vehicle (for example, a display unit of a vehicle navigation device). For such a system, there is known a method, by adjusting a difference between an assumed image capturing a subject (index) whose position information is known and an actual image of the index actually taken by the camera, to obtain parameters for calibration of a camera mounting position (for example, see Patent Document 1 and Non-Patent Document 1).

RELATED ART DOCUMENTS

Patent Document
Patent Document 1: Japanese Patent Laid-Open No. 2000-209577
Non-Patent Document
Non-Patent Document 1: [online], Jul. 22, 2007, [searched on Apr. 4, 2012], a webpage<URL:http://gazoo.com/G-Blog/chibanocienta/25496/Article.aspx>

SUMMARY OF THE INVENTION

FIG. 14 is a diagram illustrating an image displayed in a display unit 4 in a conventional camera calibration mode (camera optical axis adjusting mode) for calibration of displacement of the camera mounting position (a camera optical axis). A reference numeral 43 represents an edge of a bumper of a vehicle displayed when the camera is mounted near the bumper. In order to obtain parameters for calibration of displacement of the camera mounting position, it is necessary, for adjustment of displacement between an index 41 (actual image) and a calibration object 40 (assumed image) displayed on the display unit 4, to shift the calibration object 40 to overlap the index 41 by using shift instruction units 51-56. However, there has been a problem that, in order to overlap the calibration object 40 on the index 41, a user needs to shift the calibration object 42 multiple times in vertical, horizontal and rotational directions by using the shift instruction units 51-56. Accordingly, a complex operation is required and calibration takes time.

FIG. 15 is a diagram illustrating images displayed on the display unit in camera calibration operation in the conventional camera calibration mode. When the index 41 and the calibration object 40 in an initial state (before being shifted) are displayed at the positions illustrated in FIG. 14, the user, as illustrated in FIG. 5(a), first shifts the calibration object 40 in a left direction by using the left instruction unit 51. Then, as illustrated in FIG. 15(b), the user shifts the calibration object 40 upward by using the upward instruction unit 54. Next, as illustrated in FIG. 15(c), the user rotates the calibration object 40 counterclockwise about a center point thereof by using the counterclockwise rotation instruction unit 55.

Here, the index 41 supposedly fits in the calibration object 40. However, the camera mounted on the vehicle often employs a lens with large distortion, such as a fish lens, for taking a wide angled image. Therefore, when the calibration object 40 is rotated as illustrated in FIG. 15(c), one end of the index 41 may slightly protrude from the calibration object 40 due to the distortion of the lens. In such a case, the user needs to slightly shift the calibration object 40 in the left direction by using the left instruction unit 51, for example, as illustrated in FIG. 15(d) and then to slightly shift the calibration object 40 downward by using the downward instruction unit 53 as illustrated in FIG. 15(e). Then, the user, as illustrated in FIG. 15(f), needs to slightly rotate the calibration object 40 clockwise by using the clockwise rotation instruction unit 56. In calibration of displacement of the camera mounting position, as described above, it is often the case that multiple operations are required for fine adjustments after rotating the calibration object 40.

Accordingly, it is an object of the present invention, in consideration of such a problem, to provide a calibration operation device, a camera device, a camera system and a camera calibration method that may simplify an operation for calibration of displacement of the camera mounting position and shorten a time necessary for calibration.

In order to solve the above problem, a camera device according to one embodiment includes:
a camera mounted on a predetermined position of a movable object and configured to take an image including an index provided outside the movable object;
an image superimposing unit configured to generate a superimposed image by superimposing a calibration object having a first adjustment part for indicating a predetermined area and a second adjustment part for indicating a predetermined rotation area on the image taken by the camera; and
a calculation unit configured to control the image superimposing unit to generate the superimposed image in which the calibration object is shifted based on a shift instruction of the calibration object and to calculate, based on a position of the calibration object after being shifted in the superimposed image such that one end of the index is included in the predetermined area of the first adjustment part and the index is positioned in the predetermined rotation area of the second rotation part, a pan angle, a tilt angle and a roll angle for calibration of a camera mounting position.

The camera device according to one embodiment, wherein the calculation unit, in calculating a shift amount of the calibration object in a rotational direction, sets a center of the first adjustment part as a rotation center.

The camera device according to one embodiment, wherein the second adjustment part defines the predetermined rotation area by using a plurality of lines having a predetermined space therebetween or a line having a predetermined width.

The camera device according to one embodiment, wherein the first adjustment part is formed of a circular figure to define the predetermined area.

The camera device according to one embodiment, wherein the first adjustment part defines adjustment fineness of a pan angle and a tilt angle based on a diameter of the circle, and the second adjustment part defines adjustment fineness of a roll angle based on a length and the space of the plurality of lines having the predetermined space therebetween, or on a length and the width of the line having the predetermined width.

The camera device according to one embodiment, wherein the calibration object further includes a first auxiliary adjustment part, and the first auxiliary adjustment part indicates a predetermined area larger than the predetermined area of the first adjustment part and disposed surrounding the first adjustment part.

The camera device according to one embodiment, wherein a boundary line of the area of the first auxiliary adjustment part is different in color from the area of the first adjustment part.

The camera device according to one embodiment, wherein the first auxiliary adjustment part is formed of a circular figure to define the predetermined area.

The camera device according to one embodiment, wherein the calibration object further includes a second auxiliary adjustment part, and the second auxiliary adjustment part indicates a predetermined rotation area.

The camera device according to one embodiment, wherein a boundary line of the rotation area of the second auxiliary adjustment part is different in color from the boundary line of the second adjustment part.

The camera device according to one embodiment, wherein the second auxiliary adjustment part is formed of a plurality of lines having a predetermined space therebetween or a line having a predetermined width to define the predetermined rotation area.

The camera device according to one embodiment, wherein the image superimposing unit, when the index displayed in the image taken by the camera has distortion, generates a superimposed image in which the calibration object having the second adjustment part tilted from a horizontal direction by an angle determined based on the distortion.

Moreover, in order to solve the above problem, a camera calibration method according to one embodiment includes:

an image taking step to take an image including an index provided outside a movable object by a camera mounted on a predetermined position of the movable object;

a display step to display a superimposed image in which a calibration object having a first adjustment part indicating a predetermined area and a second adjustment part indicating a predetermined rotation area is superimposed on the image taken by the camera;

a shift step to shift the calibration object such that one end of the index is included in the predetermined area of the first adjustment part;

a rotation step to rotate the calibration object about the first adjustment part until the index is positioned in the predetermined rotation area of the second adjustment part; and a calculation step to calculate, based on a shift amount of the calibration object specified by the shift step and the rotation step, a pan angle, a tilt angle and a roll angle for calibration of displacement of a camera mounting position.

Moreover, in order to solve the above problem, a calibration operation device according to one embodiment mounted on a predetermined position of a movable object for calibrating, by using an image taken by a camera for taking an image including an index provided outside the movable object, displacement of a camera mounting position relative to a pan angle, a tilt angle and a roll angle, includes:

an image superimposing unit configured to generate a superimposed image by superimposing a calibration object having a first adjustment part for indicating a predetermined area and a second adjustment part for indicating a predetermined rotation area on the image taken by the camera; and a calculation unit configured to control the image superimposing unit to generate the superimposed image in which the calibration object is shifted based on a shift instruction of the calibration object and to calculate, based on a position of the calibration object after being shifted in the superimposed image such that one end of the index is included in the predetermined area of the first adjustment part and the index is positioned in the rotation area of the second adjustment part, the pan angle, the tilt angle and the roll angle for calibration of the displacement of the camera mounting position.

Moreover, in order to solve the above problem, a camera system according to one embodiment includes:

a camera mounted on a predetermined position of a movable object and configured to take an image including an index provided outside the movable object;

an image superimposing unit configured to generate a superimposed image by superimposing a calibration object having a first adjustment part indicating a predetermined area and a second adjustment part indicating a predetermined rotation area on the image taken by the camera;

a display unit disposed inside the movable object and configured to display the superimposed image;

an instruction unit configured to instruct the calibration object to shift a display position of the calibration object in the superimposed image; and a calculation unit configured to control the image superimposing unit to generate the superimposed image in which the calibration object is shifted based on a shift instruction of the calibration object by the instruction unit and to calculate, based on a position of the calibration object after being shifted in the superimposed image such that one end of the index is included in the predetermined area of the first adjustment part and the index is positioned in the predetermined rotation area of the second adjustment part, a pan angle, a tilt angle and a roll angle for calibration of displacement of a camera mounting position.

According to the embodiments, an operation for calibration of displacement of the camera is simplified and a time necessary for calibration is shortened.

DETAILED DESCRIPTION OF EMBODIMENTS OF THE INVENTION

Embodiments of the present invention will be described with reference to the accompanying drawings.

Figure 1:
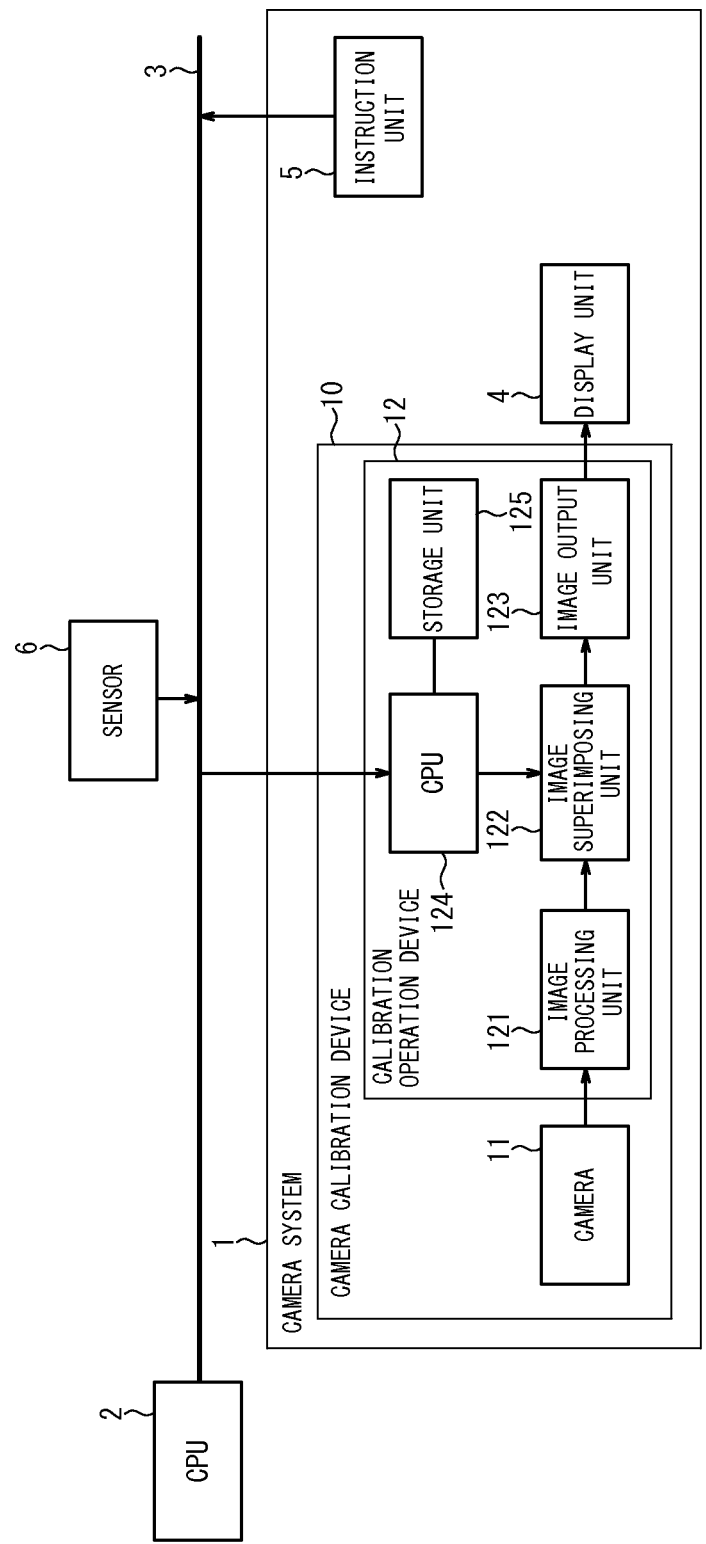
FIG. 1 is a block diagram illustrating an example of a configuration of a system mounting a camera system according to one embodiment of the present invention.

FIG. 1 is a block diagram illustrating an example of a configuration of a system when a camera system according to the embodiment of the present invention is mounted on a movable object (for example, a vehicle). As illustrate in FIG. 1, the system mounted on the movable object includes a camera system 1, a CPU 2 for controlling the entire system, a bus 3 and a sensor 6. The camera system 1 includes a camera calibration device (camera device) 10, a display unit 4 and an instruction unit 5. The camera calibration device 10 includes a camera 11 and a calibration operation device 12. The calibration operation device 12 includes an image processing unit 121, an image superimposing unit 122, an image output unit 123, a CPU (calculation unit) 124 and a storage unit 125.

The camera 11 has an image sensor such as CMOS or CCD for converting the light of a subject entering through a lens into an electric signal and generating an image of the subject. The camera 11 is mounted on a predetermined position of the movable object. However, when the camera calibration device 10 serves as a module incorporated in the camera 11, the camera calibration device 10 is mounted on the predetermined position of the movable object.

Figure 2:
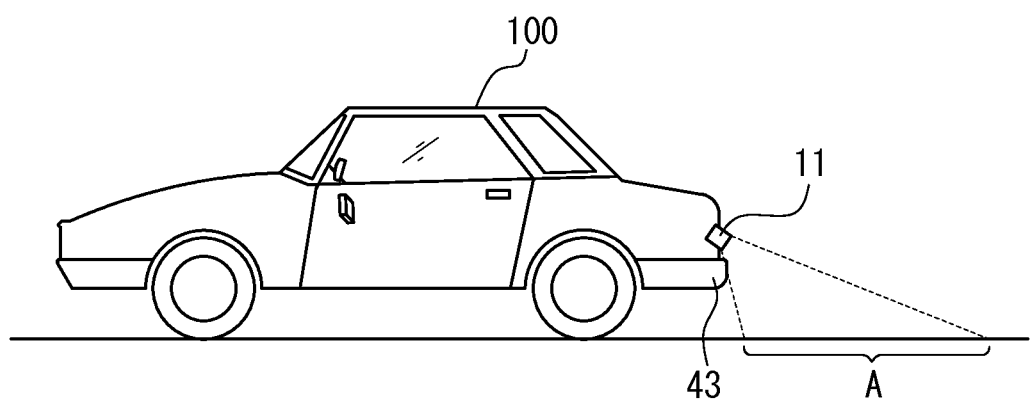
FIG. 2 is a diagram illustrating a movable object having a camera mounted thereon facing backward.

FIG. 2 is a diagram illustrating the movable object having the camera 11 mounted thereon facing backward, as one example. According to the present embodiment, as illustrated in FIG. 2, the camera 11 is mounted near a bumper 43 on a rear side of a movable object 100 to take an image behind the movable object 100. An area A in the figure represents an area captured by the camera 11. Needless to say, the present invention is also applicable to examples in which the camera 11 is mounted on the movable object facing forward or sideways.

The display unit 4, when a parking mode is selected as a user changes into a reverse gear, for example, displays an image generated by the camera system 1. The parking mode assists smooth parking by displaying, on the display unit 4, an image in the area A behind the movable object 100, where it is difficult for the user driving the movable object 100 to view. A predicted track of the movable object 100 may be superimposed on the image in the area A behind the movable object 100, for assisting smoother parking.

Also, when a camera calibration mode is selected by the user, the image generated by the camera system 1 is displayed. The camera calibration mode, by preliminarily disposing a subject or figure as an index in the area A behind the movable object 100, allows the user to calibrate a mounting position of the camera 11 by using an image of the index taken by the camera 11. The camera calibration mode is used when the camera 11 is mounted on the movable object 100 in a production line of the movable object 100 or when the camera 11 is displaced due to vibrations of the movable object 100. A detailed calibration method will be described below.

When a navigation mode is selected by the user, the display unit 4 may display a route map to a destination obtained by a navigation system. When a TV mode is selected, the display unit 4 may display television obtained by a TV receiver.

The instruction unit 5 serves as a user interface for adjustment of a position of the calibration object superimposed in the display unit 4. The instruction unit 5 may be operated to shift the calibration object in vertical, horizontal and rotational directions. The instruction unit 5 outputs an object shift signal obtained by an operation by the user to the CPU 124 via the bus 3. When an adjustment operation ends, the instruction unit 5 outputs an adjustment end signal to the CPU 124 via the bus 3. The instruction unit 5 may be a mechanical switch provided near the display unit 4 or an object displayed on a touch panel laminated on the display unit 4.

The sensor 6 includes a speed sensor for detecting a moving speed of the vehicle, a gear sensor for detecting a position of a gear lever, and a steering angle sensor for detecting a steering angle. The sensor 6 outputs a sensor signal obtained from each sensor to the CPU 124 and the CPU 2 via the bus 3.

The storage unit 125 stores a position coordinate of the camera 11, a position coordinate of the index as known values, and the like. The storage unit 125 also stores a direction of an optical axis when the camera 11 is accurately mounted, as a known value.

The CPU 124 determines a display position of the calibration object by calculating a shift amount based on the object shift signal obtained from the instruction unit 5 while the calibration object is displayed, and instructs the image superimposing unit 122 to generate a superimposed image. Also, the CPU 124, upon receiving a calibration end instruction from the instruction unit 5, calculates calibration parameters (a pan angle, a tilt angle and a roll angle) for calibration of displacement of the mounting position of the camera 11. Further, the CPU 124, in the parking mode, determines a display position of the predicted track of the movable object 100 based on the sensor signal obtained from the sensor 6 and instructs the image superimposing unit 122 to generate the superimposed image.

The image processing unit 121 generates a digital image by performing A/D conversion, noise reduction processing and image processing to the image taken by the camera 11 and outputs the digital image to the image superimposing unit 122.

The image superimposing unit 122, based on the instruction by the CPU 124, generates the superimposed image by superimposing an image on a predetermined position of the digital image generated by the image processing unit 121 and outputs the superimposed image to the image output unit 123. The image to be superimposed is the calibration object used for calibration of the mounting position of the camera 11 or the predicted track to be followed by the movable object 100 moving backward, for assisting parking.

The image output unit 123 converts the superimposed image generated by the image superimposing unit 122 into a format (for example, NTSC) appropriate for a display device of the display unit 4 and outputs the converted superimposed image to the display unit 4.

Figure 3:
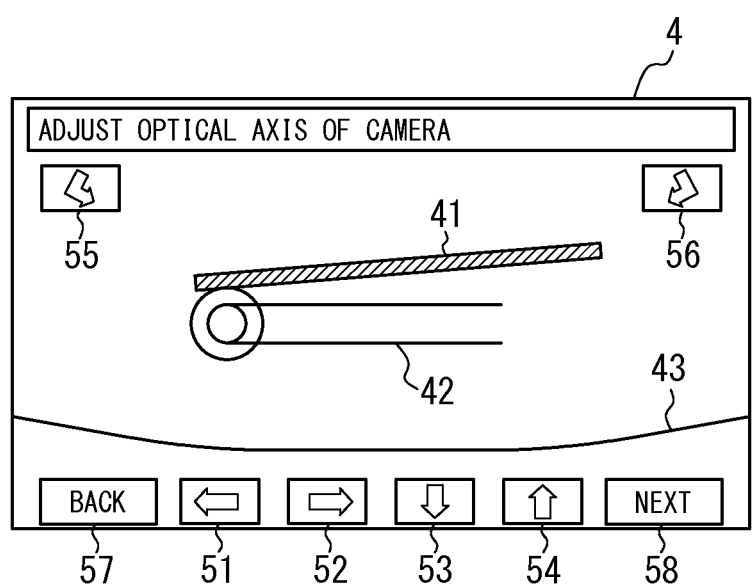
FIG. 3 is a diagram illustrating an example of an image displayed in a display unit of the camera system according to one embodiment of the present invention.

FIG. 3 is a diagram illustrating an example of an image displayed in the display unit 4 when the camera calibration mode is selected by the user or the like. The display unit 4 displays an image taken by the camera 11 including an index 41, and a calibration object 42. When the camera 11 is mounted near the bumper 43 as illustrated in FIG. 2, an edge of the bumper 43 is also displayed.

Figure 4:
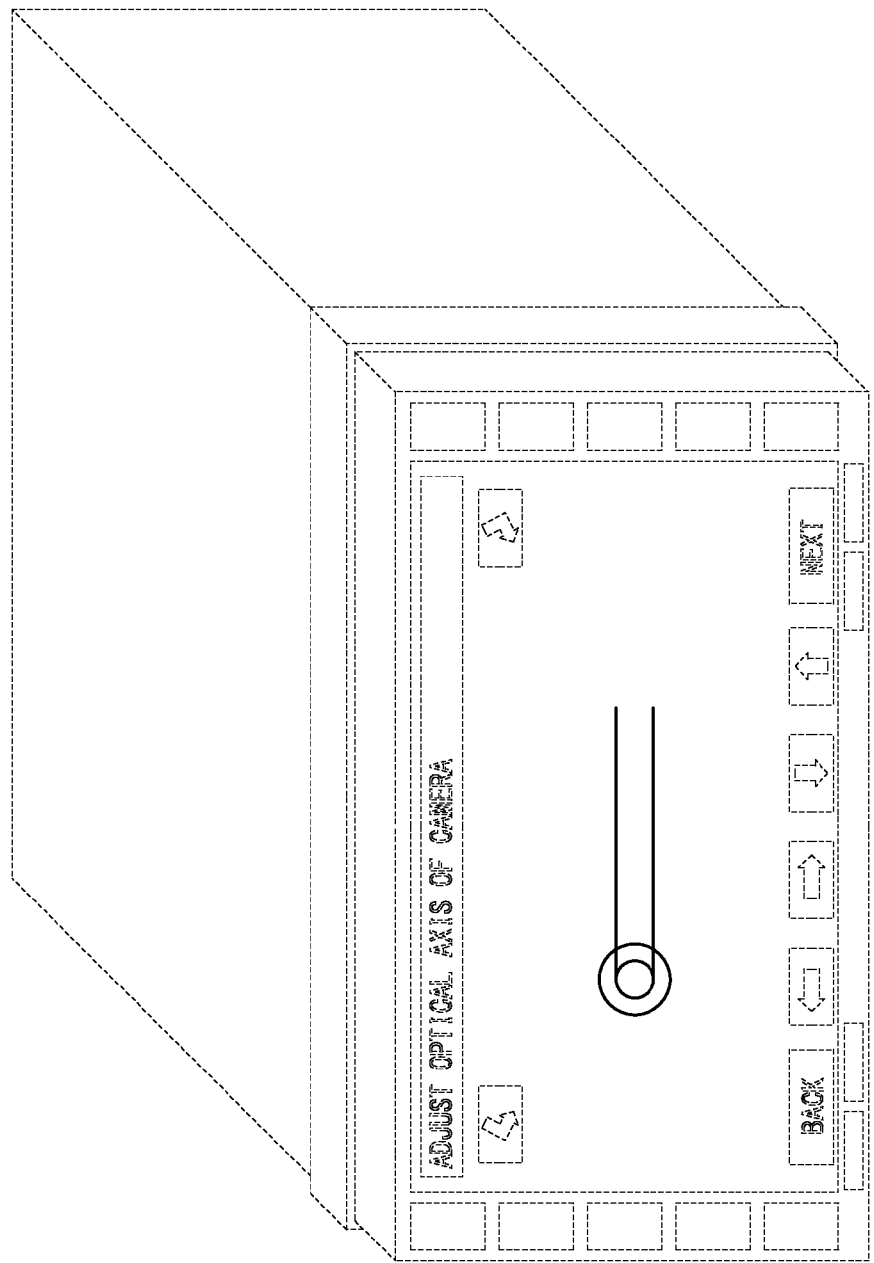
FIG. 4 is a diagram illustrating a front face, a planar face and a right face of the camera system according to one embodiment of the present invention.

FIG. 4 is a diagram illustrating a front face, a planar face and a right face of the display unit 4. In FIG. 4, the calibration object 42, which is a characteristic image used for calibration, is indicated by solid lines and other parts are indicated by broken lines. This figure is a cabinet projection drawing with 45 degree inclination illustrating the front face, the planar face and the right face. A rear view, a bottom plan view and a left side view of the display unit 4 are omitted as the calibration object 42 is not displayed thereon. Note that the shape formed of the broken lines is for illustrative purposes and not limited thereto.

The index 41 is the subject or figure disposed at a predetermined distance (for example, 1 m) from a rear edge of the movable object 100 when the movable object 100 is accurately stopped at a predetermined parking position, and takes the shape of, for example, a rectangular plate or a white line drawn on a road. That is, when the camera 11 is mounted at a correct angle, a positional relationship between the movable object 100 and the index 41 is specified, thus the index 41 taken by the camera 11 is always displayed at a specific position on the image displayed on the display unit 4. When the index 41 is displayed off the specified position, the instruction unit 5 may issue an instruction to shift the calibration object 42 to the index 41 in the image. Thereby, the calibration parameters for specifying deviation of a mounting angle of the camera 11 may be obtained.

When the instruction unit 5 is an object displayed on a touch panel laminated on the display unit 4, a left instruction unit 51, a right instruction unit 52, a downward instruction unit 53, an upward instruction unit 54, a counterclockwise rotation instruction unit 55, a clockwise rotation instruction unit 56, a back instruction unit 57 and a next instruction unit 58, which compose the instruction unit 5, are displayed as illustrated in FIG. 3.

The left instruction unit 51 is used to shift the calibration object 42 in a left direction and the right instruction unit 52 is used to shift the calibration object 42 in a right direction. The downward instruction unit 53 is used to shift the calibration object 42 downward and the upward instruction unit 54 is used to shift the calibration object 42 upward. The counterclockwise rotation instruction unit 55 is used to rotate the calibration object 42 counterclockwise and the clockwise rotation instruction unit 55 is used to rotate the calibration object 42 clockwise. The back instruction unit 57 is used to restore an image displayed before the image for the camera calibration mode is displayed. The next instruction unit 58 is used to inform that an operation to shift the calibration object 42 to overlap the index 41 in the image is finished.

Here, when a single pressing of the left instruction unit 52 or the right instruction unit 54 is made correspond to offset at 0.5 degree, the calibration object 42, upon a single pressing of the left instruction unit 52 or the right instruction unit 54, is shifted by the number of pixels equivalent to a shift amount of the image when an image taking direction of the camera 11 is directed by 0.5 degree in a pan (horizontal) direction. The same applies to the tilt (vertical) direction and a roll (rotational) direction.

Figure 5:
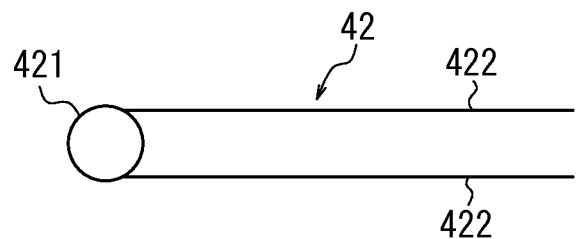
FIG. 5 is a diagram illustrating an example of a calibration object displayed in the display unit of the camera system according to one embodiment of the present invention.

FIG. 5 is a diagram illustrating an example of the calibration object 42 displayed in the display unit 4. As illustrated in FIG. 5, the calibration object 42 has a pan-tilt adjustment part 421 as a first adjustment part for indicating a predetermined area and a roll adjustment part 422 as a second adjustment part for indicating a predetermined rotation area.

The pan-tilt adjustment part 421 is an object for obtaining a pan angle and a tilt angle as the calibration parameters by adjusting the camera in the pan direction and the tilt direction and formed of a figure having the predetermined area. A size of the area of the pan-tilt adjustment part 421 defines adjustment fineness of the pan angle and the tilt angle. That is, the user, simply by shifting the calibration object 42 such that one end of the index 41 in the image is included in the pan-tilt adjustment part 421, may end adjustment of the camera in the pan direction and the tilt direction. When the adjustment fineness of is ±0.5 degree in each of the pan direction and the tilt direction, for example, the area of the pan-tilt adjustment part 421 takes the shape of a circle with a regular radius as illustrated in FIG. 5. Here, when the adjustment fineness of the pan angle is ±0.5 degree and that of the tilt angle is ±0.3 degree, for example, the pan-tilt adjustment part 421 takes the shape of oval instead of a true circle.

Also, the adjustment fineness of the pan angle and the tilt angle defined by the size of the area of the pan-tilt adjustment part 421 is preferably an integral multiple of a shift amount in the image associated with a change of a camera angle corresponding to one pressing of the left instruction unit 51, the right instruction unit 52, the downward instruction unit 53 and the upward instruction unit 54. Thereby, the user or the like may easily recognize an adjustment amount.

The roll adjustment part 422 is an object for obtaining the roll angle as the calibration parameter by adjusting the camera in the roll direction and formed of lines stretching in the same direction having a predetermined space therebetween (for example, two lines parallel to each other). The adjustment accuracy of the roll angle is defined by a length of and the space between the two straight lines of the roll adjustment part 422. That is, the user, simply by rotating the calibration object 42 about a center point of the pan-tilt adjustment part 421 between two parallel lines of the roll adjustment part 422 while maintaining one end of the index 41 included in the pan-tilt adjustment part 421 until the index 41 becomes non-orthogonal to the parallel lines, may end adjustment of the camera in the roll direction. In this case, since the calibration object 42 is rotated about the center point of the pan-tilt adjustment part 421 while a left end of the index 41 is maintained meeting the pan-tilt adjustment part 421, the index 41 and the pan-tilt adjustment part 421 maintains a positional relationship between each other when the pan-tilt adjustment part 421 is rotated in conjunction with the rotation of the calibration object 42. That is, secondary fine adjustment is hardly necessitated by the rotation of the calibration object 42.

Also, the adjustment fineness of the roll angle defined by the length of and the space between the straight lines of the roll adjustment part 422 is preferably an integral multiple of the shift amount of the camera corresponding to one pressing of the counterclockwise rotation instruction unit 55 and the clockwise rotation instruction unit 56. Thereby, the user or the like may easily recognize an adjustment amount.

Figure 6:
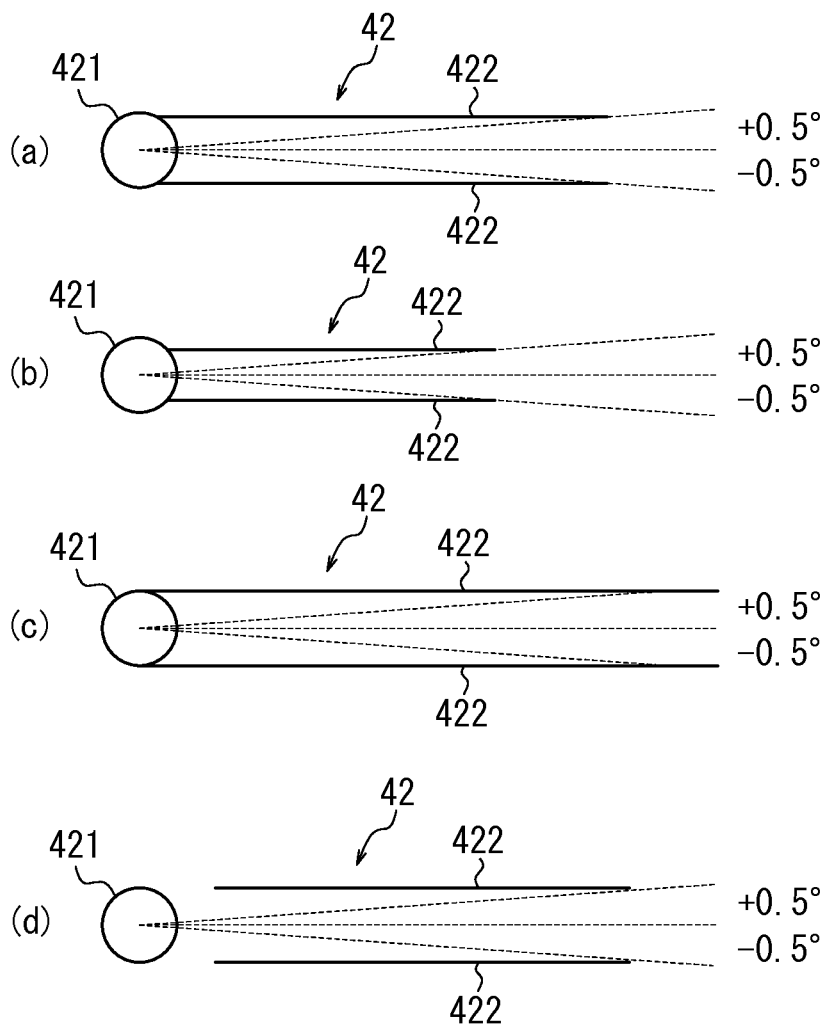
FIG. 6(a)-(d) are diagrams illustrating a relationship between a space and a length of a roll adjustment part of the calibration object displayed in the display unit of the camera system according to one embodiment of the present invention.

FIG. 6 is a diagram illustrating a relationship between the space between and the length of the roll adjustment part 422 of the calibration object 42. In FIG. 6, broken lines indicate possible positions of the index 41. Each adjustment fineness of the roll angle, as illustrated in FIG. 6(*a*)-(*d*), is ±0.5 degree, for example. Having the adjustment fineness of the roll angle at a fixed value, the parallel lines of the roll adjustment part 422 become shorter when the space therebetween is narrow as illustrated in FIG. 6(*b*), and the parallel lines of the roll adjustment part 422 become longer when the space therebetween is wide as illustrated in FIG. 6(*c*). Note that it is not necessary to join the pan-tilt adjustment part 421 and the roll adjustment part. As illustrated in FIG. 6(*d*), the pan-tilt adjustment part 421 and the roll adjustment part 422 may have a gap therebetween.

Figure 7:
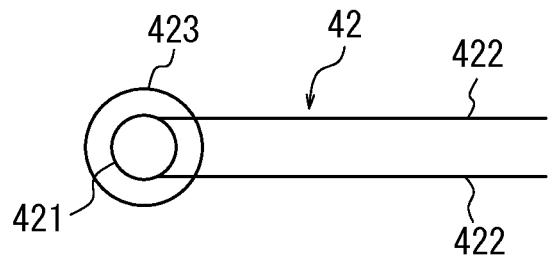
FIG. 7 is a diagram illustrating an example of a calibration object having a pan-tilt auxiliary adjustment part displayed in the display unit of the camera system according to one embodiment of the present invention.

As illustrated in FIG. 7, also, the calibration object 42 may further include a pan-tilt auxiliary adjustment part 423 (first auxiliary adjustment part). The pan-tilt auxiliary adjustment part 423 is formed of a figure having an area larger than the area of the pan-tilt adjustment part 421 and disposed surrounding the pan-tilt adjustment part 421. For example, a diameter of the pan-tilt auxiliary adjustment part 423 is twice as long as that of the pan-tilt adjustment part 421. A boundary line of the area of the pan-tilt auxiliary adjustment part 423 is in color different from that of the area of the pan-tilt adjustment part 421. For example, the boundary line of the area of the pan-tilt auxiliary adjustment part 423 is in yellow and the boundary line of the area of the pan-tilt adjustment part 421 is in red.

When the pan-tilt adjustment part 421 is small in size or in color similar to that of a background of the image displayed in the display unit 4, the user may not be able to immediately distinguish the pan-tilt adjustment part 421. However, the calibration object 42 having the pant-tilt auxiliary adjustment part 423 enables the user to recognize a position of the pan-tilt adjustment part 421 at a glance.

Figure 8:
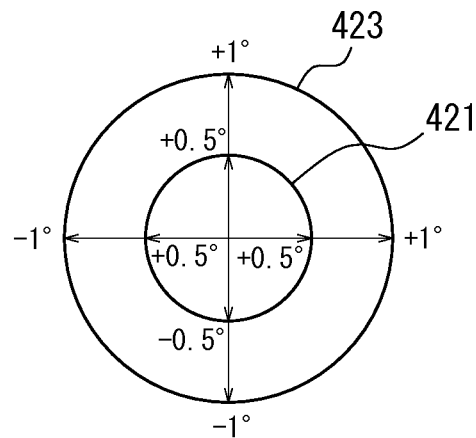
FIG. 8 is a diagram illustrating adjustment fineness of a pan angle and a tilt angle of the calibration object displayed in the display unit of the camera system according to one embodiment of the present invention.

The pan-tilt auxiliary adjustment part 423, similarly to the pan-tilt adjustment part 421, may define the adjustment fineness of the pan angle and the tilt angle. As illustrated in FIG. 8, for example, the adjustment fineness of each of the pan angle and the tilt angle of the pan-tilt adjustment part 421 is set to ±0.5 degree and the adjustment fineness of each of the pan angle and the tilt angle of the pan-tilt auxiliary adjustment part 423 is set to ±0.1 degree. Defining two different adjustment fineness, when there is no need for high accuracy, enables to end calibration of the camera in the pan direction and in the tilt direction simply by including one end of the index 41 in the pan-tilt auxiliary adjustment part 423. Thereby, the time necessary for calibration may be shortened.

Figure 9:
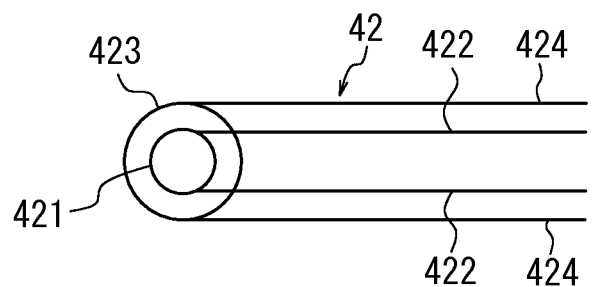
FIG. 9 is a diagram illustrating an example of a calibration object having a pan-tilt auxiliary adjustment part and a roll auxiliary adjustment part displayed in the display unit of the camera system according to one embodiment of the present invention.

As illustrated in FIG. 9, also, the calibration object 42, in addition to the pan-tilt auxiliary adjustment part 423, may further include a roll auxiliary adjustment part 424 (second auxiliary part). Or, the calibration object 42 may have one of the pan-tilt auxiliary adjustment part 423 and the roll auxiliary adjustment part 424. The roll auxiliary adjustment part 424 is formed of lines stretching in the same direction (for example, two parallel lines) having a space wider than that of the roll adjustment part 422 and disposed holding the roll adjustment part 422 therebetween. For example, the space between the lines of the roll auxiliary adjustment part 424 is twice as long as that between the lines of the pan-tilt auxiliary adjustment part 423. The two straight lines of the pan-tilt roll auxiliary adjustment part 424 are in color different from that of the two straight lines of the roll adjustment part 422. For example, the parallel lines of the roll auxiliary adjustment part 424 are in yellow and the parallel lines of the roll adjustment part 422 are in red.

When the roll adjustment part 422 is small in size or in color similar to that of the background of the image displayed in the display unit 4, the user may not be able to immediately distinguish the roll adjustment part 422. However, the calibration object 42 having the roll auxiliary adjustment part 424 enables the user to recognize a position of the roll adjustment part 422 at a glance.

The roll auxiliary adjustment part 424, similarly to the roll adjustment part 422, may define the adjustment fineness of the roll angle based on the length of the two straight lines and the space therebetween. For example, the adjustment fineness of the roll angle of the roll adjustment part 422 is set to ±0.5 degree and the adjustment fineness of the roll angle of the roll auxiliary adjustment part 424 is set to ±1 degree. Defining two different adjustment fineness, when there is no need for high accuracy, enables to end calibration of the camera in the roll direction simply by positioning the index 41 in the roll auxiliary adjustment part 424. Thereby, the time necessary for calibration may be shortened.

Figure 10:
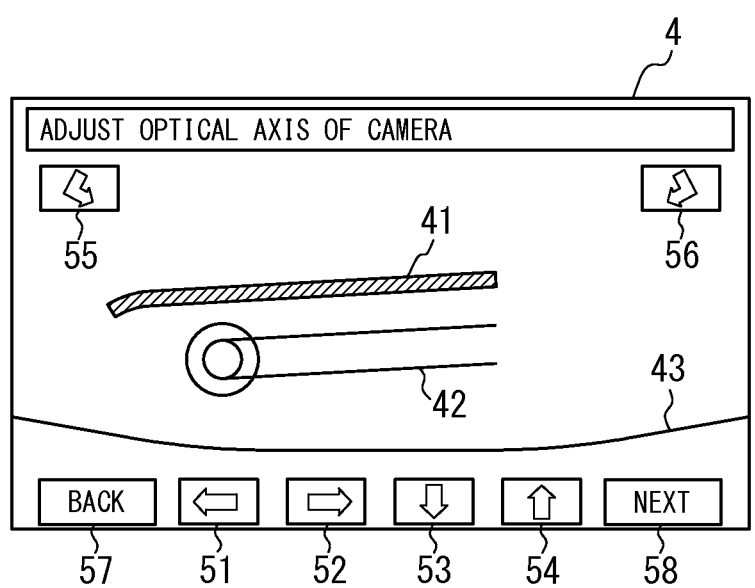
FIG. 10 is a diagram illustrating an example of the calibration object having an index disposed at an edge displayed in the display unit of the camera system according to one embodiment of the present invention.

FIG. 10 is a diagram illustrating an example when the index 41 is disposed at an edge of the display 4. Because of characteristics of a lens, the image obtained by the camera calibration device 10 has slight distortion near a center thereof and strong distortion at edges thereof. Therefore, when the index 41 is disposed at a position other than the center of the image, an end of the index 41 may be distorted as illustrated in FIG. 10 and, as a result, an image of the index 41 is bent. The CPU 124, when distortion of the end of the index 41 is expected based on the mounting position of the camera 11 at a known position, the position of the index 41, an ideal optical axis direction and a parameter of the lens distortion, calculates an expected distortion amount of the index 41. The image superimposing unit 122 generates the superimposed image by superimposing the calibration object 42 having the two straight lines of the roll adjustment part 422 tilted from the horizontal direction by an angle determined based on the distortion. As illustrated in FIG. 10, tilting the image of the calibration object 42 from the horizontal direction according to the distortion of the index 41 in an original state (before being shifted) facilitates adjustment in the rotational direction when one end of the index 41 is distorted.

Figure 11:
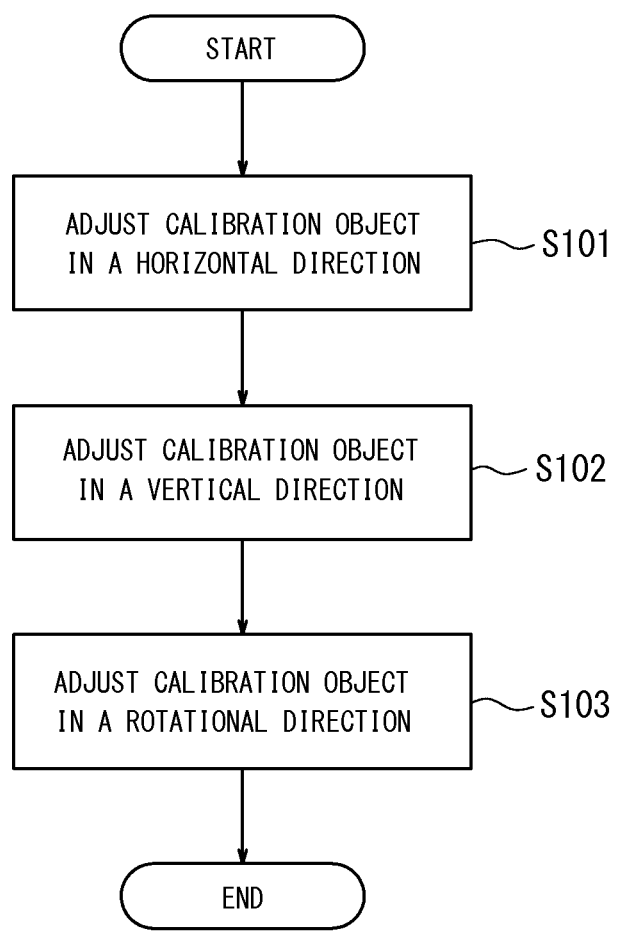
FIG. 11 is a flowchart illustrating a calibration operation of a camera by the camera system according to one embodiment of the present invention.
Figure 12:
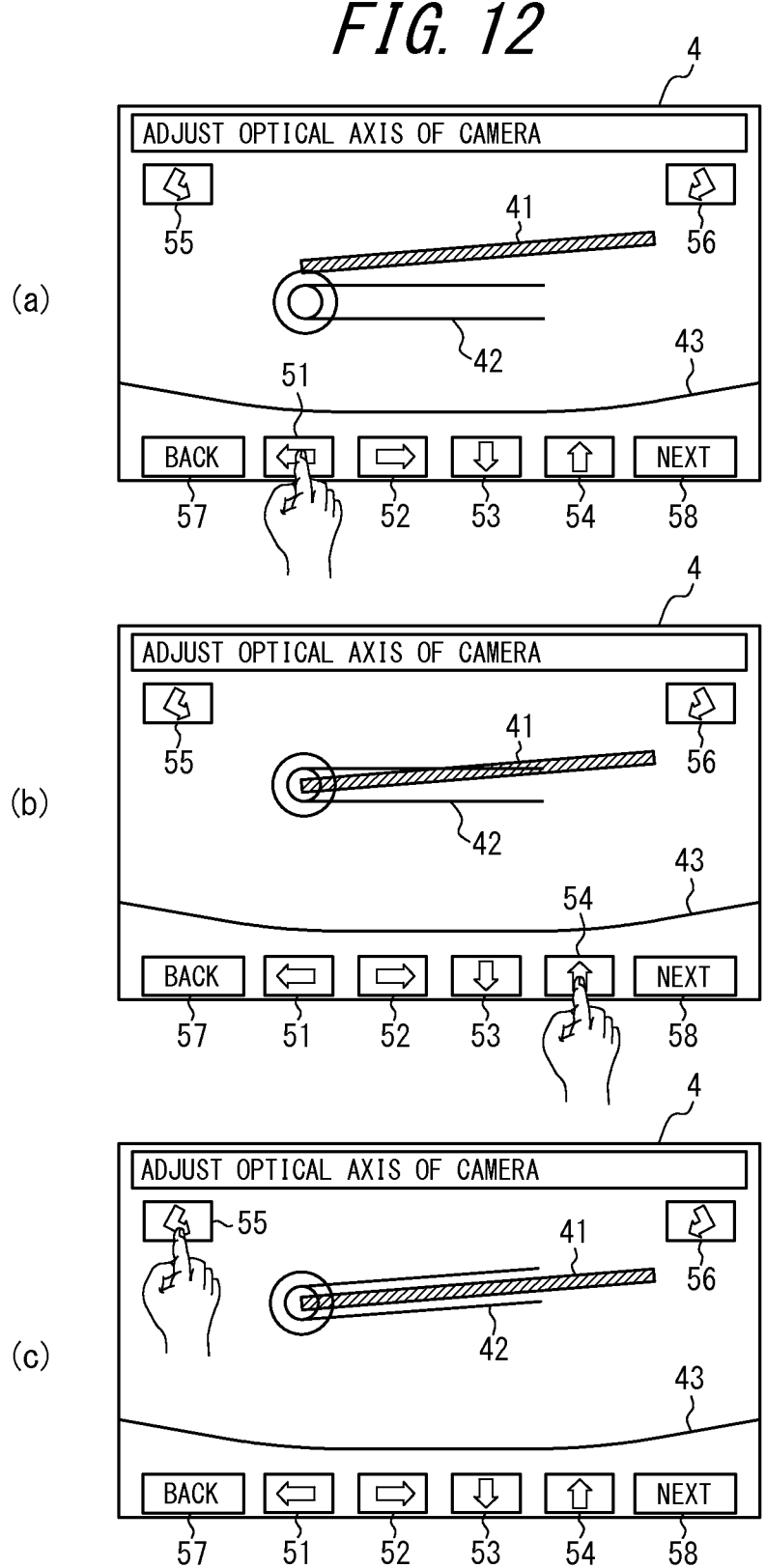
FIG. 12(a)-(c) are diagrams illustrating images displayed in the display unit in calibration operation of the camera by the camera system according to one embodiment of the present invention.

Next, a calibration operation of the camera by the camera system 1 will be described. FIG. 11 is a flowchart illustrating the calibration operation of the camera by the camera system 1. FIG. 12 is a diagram illustrating images displayed in the display unit 4 in calibration operation of the camera.

The user shifts the calibration object 42 in the horizontal direction such that the pan-tilt adjustment part 421 of the calibration object 42 meets the ends of the index 41 in the horizontal direction (step S101). FIG. 12(*a*) illustrates a state when the left instruction unit 51 is pressed down and the calibration object 42 is shifted in the left direction.

Next, the user shifts the calibration object 42 in the vertical direction such that the pan-tilt adjustment part 421 of the calibration object 42 meets the index 41 (step S102). FIG. 12 (*b*) illustrates a state when the upward instruction unit 54 is pressed down and the calibration object 42 is shifted upward. The user performs operations at step S101 and step S102 to shift the calibration object 42 such that one end of the index 41 is included in the area of the pan-tilt adjustment part 421.

Then, the user rotates the calibration object 42 about the center point of the pan-tilt adjustment part 421 in the rotational direction until the index 41 is positioned between the parallel lines of the roll adjustment part 422 of the calibration object 42 without becoming orthogonal to the parallel lines (step S103). FIG. 12(c) illustrates a state when the counterclockwise rotation instruction unit 55 is pressed down and the calibration object 42 rotates counterclockwise.

Figure 13:
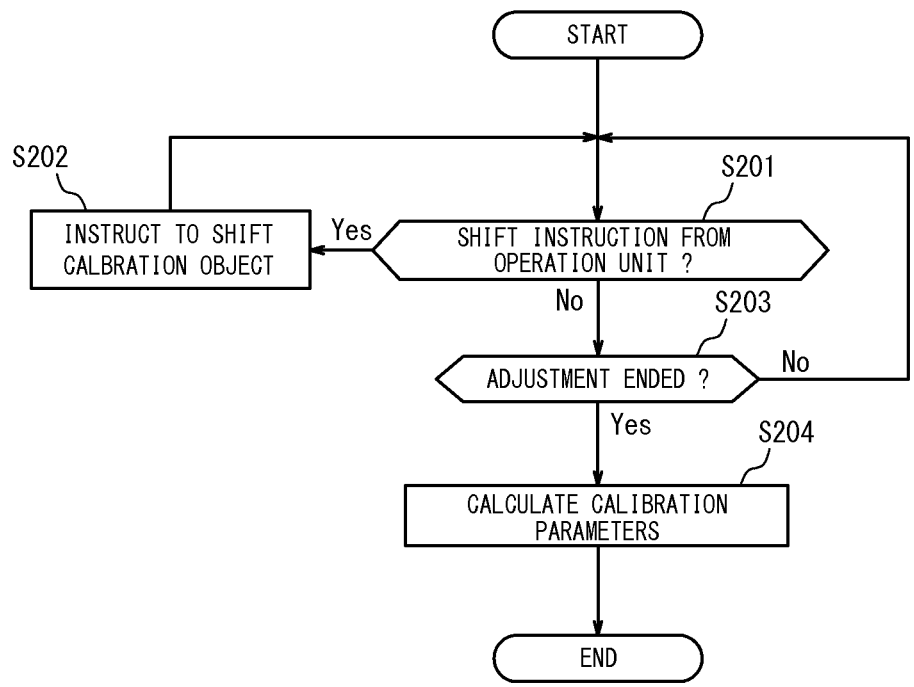
FIG. 13 is a flowchart illustrating an operation of a CPU in calibration operation of the camera by the camera system according to one embodiment of the present invention.
Figure 14:
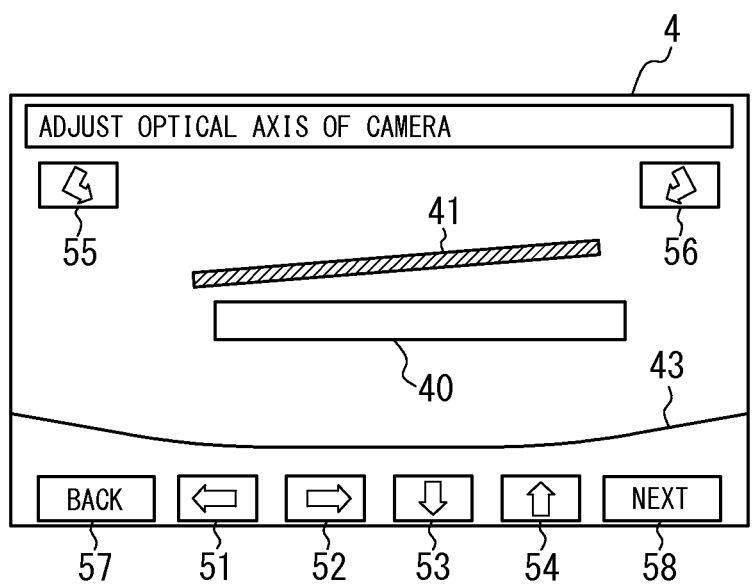
FIG. 14 is a diagram illustrating an image displayed in the display unit in a conventional camera calibration mode.
Figure 15:
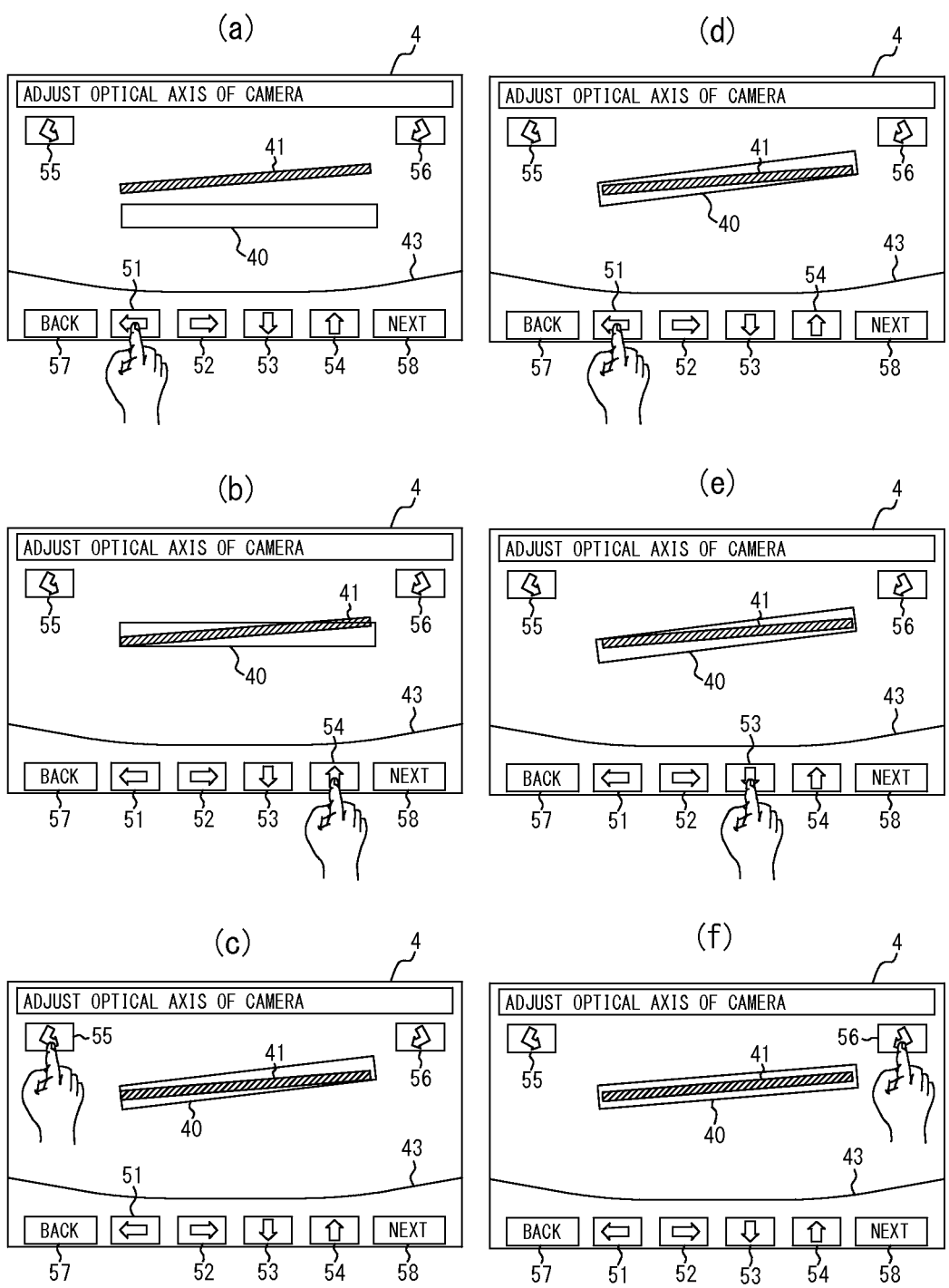
FIG. 15(a)-(f) are diagrams illustrating images displayed in the display unit in calibration operation of the camera in the conventional camera calibration mode.

FIG. 13 is a flowchart illustrating an operation of the CPU 124 for the calibration operation of the camera 11. When the CPU 124 receives the object shift signal from the instruction unit 5 (Yes at step S201), the CPU 124 calculates the shift amount and instructs the image superimposing unit 122 to superimpose the calibration object 42 after being shifted (step S202). Here, in calculation of the shift amount of the calibration object 42 in the rotational direction, the CPU 124 regards the center point of the pan-tilt adjustment part 421 as a center point of the rotation. Thereby, displacement of the index 41 and the calibration object 42 caused by rotation may be prevented. Accordingly, it is not necessary to finely adjust the calibration object 42 in the vertical and horizontal directions after rotation, and thus the time necessary for calibration may be shortened.

When the CPU 124 does not receive the object shift signal from the instruction unit 5 (No at step S201), the CPU 124 waits for the shift instruction from the instruction unit 5 until receiving a calibration end signal from the instruction unit 5 (No at step S203). Upon receiving an adjustment end signal from the instruction unit 5 (Yes at step S203), the CPU 124 calculates the calibration parameters (a pan angle, a tilt angle and a roll angle) for calibration of displacement of a camera mounting position (step S204).

When one operation of the instruction unit 5 and the rotation angle of the camera 11 are made correspond to each other, the calibration parameters (the pan angle, the tilt angle and the roll angle), at step S204, may be calculated by counting the number of operations of the instruction unit 5. For example, when one operation of the instruction unit 5 corresponds to 0.5 degree and the user, in operation illustrated in FIG. 11, presses down the left instruction unit 51 twice at step S101, the upward instruction unit 54 twice at step S102 and the counterclockwise rotation instruction unit 51 twice at step S103, the shift amount in each of the pan angle, the tilt angle and the roll angle is 1.0 degree. The CPU 124, when adjusting the image displayed in the display unit 4 based on the obtained parameters (the pan angle, tilt angle and roll angle), performs conversion between a camera coordinate and a world coordinate.

After calculation of the calibration parameters by the CPU 124, the image taken by the camera 11 is output being offset by an amount corresponding to the calibration parameters, or output after being converted into an image corresponding to the calibration parameters. As a result, when the image superimposing unit 122 generates the superimposed image by superimposing the image of the predicted track or the like on the digital image generated by the image processing unit 121, the predicted track or the like is superimposed offset from its superimposing position prior to calculation of the calibration parameters, or converted. Therefore, a highly accurate predicted vehicle track may be displayed in parking, for example.

As described above, according to the calibration operation device 12, the camera calibration device 10, the camera system 1 and the camera calibration method of the present invention, the calibration object 42 has the pan-tilt adjustment part 421 formed of a figure having the predetermined area and the roll adjustment part 422 formed of two straight lines having the predetermined space therebetween. The CPU 124, based on a position of the calibration object when the calibration object 42 is shifted such that one end of the index 41 is included in the predetermined area of the pan-tilt adjustment part 421 and becomes non-orthogonal to the roll adjustment part 422, calibrates displacement of the camera mounting position. According to the present invention, therefore, the operation for calibration of the camera 11 may be simplified and the time necessary for the calibration may be shortened. Especially when the CPU 124 calculates the shift amount of the calibration object 42 in the rotational direction, setting the central point of the pan-tilt adjustment part 421 as the central point of the rotation enables a quick adjustment.

Note that the above embodiments are described as representative examples and those who are skilled in the art may make an alteration or replacement within a spirit and a scope of the present invention. Accordingly, it is appreciated that the present invention is not limited to the above embodiments but may be varied or altered in a multiple manner without departing from a scope of claims.

For example, although the roll adjustment part is formed of two straight lines in the example, the roll adjustment part may be formed of a gently curved line in consideration of the amount of the lens distortion, or formed of more than two lines. Or, the roll adjustment part may be formed of one thick line such that the index 41 is positioned thereon. In this case, instead of adjusting the index 41 not to become orthogonal to the parallel lines, adjustment is made by positioning the index 41 within a predetermined width. The operation other than such a slight change of adjustment is the same as that of the above embodiments. That is, the roll adjustment part only needs to indicate the rotation area with a plurality of lines or a line with the predetermined width. Further, the line(s) of the roll adjustment part may be infinite instead of finite. In this case, that is, the roll adjustment part is formed of a plurality of lines (or a single line with the predetermined width) stretching from the pan-tilt adjustment part to an edge of the image.

EXPLANATION OF REFERENCE NUMERALS

1 Camera System
2 CPU
3 Bus
4 Display Unit
5 Instruction Unit
6 Sensor
10 Camera Calibration Device
11 Camera
12 Calibration Operation Device
41 Index
42 Calibration Object
43 Bumper
51 Left Instruction Unit
52 Right Instruction Unit
53 Downward Instruction Unit
54 Upward Instruction Unit
55 Counterclockwise Rotation Instruction Unit
56 Clockwise Rotation Instruction Unit
57 Back Instruction Unit
58 Next Instruction Unit
100 Movable Object
121 Image Processing Unit
122 Image Superimposing Unit
123 Image Output Unit
124 CPU
125 Storage Unit
421 Pan-tilt Adjustment Part 422 Roll Adjustment Part
423 Pan-tilt Auxiliary Adjustment Part
424 Roll Auxiliary Adjustment Part

What is claimed is:

1. A camera device comprising:
    a camera mounted on a predetermined position of a movable object and configured to take an image including an index provided outside the movable object;
    an image superimposing unit configured to generate a superimposed image by superimposing a calibration object having a first adjustment part for indicating a predetermined area and a second adjustment part for indicating a predetermined rotation area on the image taken by the camera; and
    a calculation unit configured to control the image superimposing unit to generate the superimposed image in which the calibration object is shifted based on a shift instruction of the calibration object and to calculate, based on a position of the calibration object after being shifted in the superimposed image such that one end of the index is included in the predetermined area of the first adjustment part and the index is positioned in the predetermined rotation area of the second rotation part, a pan angle, a tilt angle and a roll angle for calibration of a camera mounting position.

2. The camera device according to claim 1, wherein the calculation unit, in calculating a shift amount of the calibration object in a rotational direction, sets a center of the first adjustment part as a rotation center.

3. The camera device according to claim 1, wherein the second adjustment part defines the predetermined rotation area by using a plurality of lines having a predetermined space therebetween or a line having a predetermined width.

4. The camera device according to claim 1, wherein the calibration object further includes a first auxiliary adjustment part, and
    the first auxiliary adjustment part indicates a predetermined area larger than the predetermined area of the first adjustment part and disposed surrounding the first adjustment part.

5. The camera device according to claim 4, wherein the first auxiliary adjustment part is formed of a circular figure to define the predetermined area.

6. The camera device according to claim 1, wherein the calibration object further includes a second auxiliary adjustment part, and
    the second auxiliary adjustment part indicates a predetermined rotation area.

7. The camera device according to claim 6, wherein a boundary line of the rotation area of the second auxiliary adjustment part is different in color from the boundary line of the second adjustment part.

8. The camera device according to claim 6, wherein the second auxiliary adjustment part is formed of a plurality of lines having a predetermined space therebetween or a line having a predetermined width to define the predetermined rotation area.

9. The camera device according to claim 3, wherein the first adjustment part is formed of a circular figure to define the predetermined area.

10. The camera device according to claim 9, wherein the first adjustment part defines adjustment fineness of a pan angle and a tilt angle based on a diameter of the circle, and
    the second adjustment part defines adjustment fineness of a roll angle based on a length and the space of the plurality of lines having the predetermined space therebetween, or on a length and the width of the line having the predetermined width.

11. The camera device according to claim 4, wherein a boundary line of the area of the first auxiliary adjustment part is different in color from the area of the first adjustment part.

12. The camera device according to claim 1, wherein the image superimposing unit, when the index displayed in the image taken by the camera has distortion, generates a superimposed image in which the calibration object having the second adjustment part tilted from a horizontal direction by an angle determined based on the distortion.

13. A camera calibration method comprising:
    an image taking step to take an image including an index provided outside a movable object by a camera mounted on a predetermined position of the movable object;
    a display step to display a superimposed image in which a calibration object having a first adjustment part indicating a predetermined area and a second adjustment part indicating a predetermined rotation area is superimposed on the image taken by the camera;
    a shift step to shift the calibration object such that one end of the index is included in the predetermined area of the first adjustment part;
    a rotation step to rotate the calibration object about the first adjustment part until the index is positioned in the predetermined rotation area of the second adjustment part; and
    a calculation step to calculate, based on a shift amount of the calibration object specified by the shift step and the rotation step, a pan angle, a tilt angle and a roll angle for calibration of displacement of a camera mounting position.

14. A calibration operation device mounted on a predetermined position of a movable object for calibrating, by using an image taken by a camera for taking an image including an index provided outside the movable object, displacement of a camera mounting position relative to a pan angle, a tilt angle and a roll angle, comprising:
    an image superimposing unit configured to generate a superimposed image by superimposing a calibration object having a first adjustment part for indicating a predetermined area and a second adjustment part for indicating a predetermined rotation area on the image taken by the camera; and
    a calculation unit configured to control the image superimposing unit to generate the superimposed image in which the calibration object is shifted based on a shift instruction of the calibration object and to calculate, based on a position of the calibration object after being shifted in the superimposed image such that one end of the index is included in the predetermined area of the first adjustment part and the index is positioned in the rotation area of the second adjustment part, the pan angle, the tilt angle and the roll angle for calibration of the displacement of the camera mounting position.

15. A camera system comprising:
    a camera mounted on a predetermined position of a movable object and configured to take an image including an index provided outside the movable object;
    an image superimposing unit configured to generate a superimposed image by superimposing a calibration object having a first adjustment part indicating a predetermined area and a second adjustment part indicating a predetermined rotation area on the image taken by the camera;

a display unit disposed inside the movable object and configured to display the superimposed image;

an instruction unit configured to instruct the calibration object to shift a display position of the calibration object in the superimposed image; and a calculation unit configured to control the image superimposing unit to generate the superimposed image in which the calibration object is shifted based on a shift instruction of the calibration object by the instruction unit and to calculate, based on a position of the calibration object after being shifted in the superimposed image such that one end of the index is included in the predetermined area of the first adjustment part and the index is positioned in the predetermined rotation area of the second adjustment part, a pan angle, a tilt angle and a roll angle for calibration of displacement of a camera mounting position.

\* \* \* \* \*